United States Patent
Takao et al.

(10) Patent No.: US 7,988,197 B2
(45) Date of Patent: Aug. 2, 2011

(54) SEAT BELT RETRACTOR AND SEAT BELT APPARATUS PROVIDED THERWITH

(75) Inventors: Masato Takao, Tokyo (JP); Koji Inuzuka, Tokyo (JP); Koji Tanaka, Tokyo (JP); Daisuke Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/733,206

(22) PCT Filed: May 19, 2008

(86) PCT No.: PCT/JP2008/059595
§ 371 (c)(1),
(2), (4) Date: Feb. 17, 2010

(87) PCT Pub. No.: WO2009/025111
PCT Pub. Date: Feb. 26, 2009

(65) Prior Publication Data
US 2010/0140913 A1 Jun. 10, 2010

(30) Foreign Application Priority Data

Aug. 23, 2007 (JP) .................. 2007-216780

(51) Int. Cl.
*B60R 22/34* (2006.01)
(52) U.S. Cl. ...................... 280/807; 242/390.8
(58) Field of Classification Search .............. 180/268; 280/807; 242/390.8, 390.9, 374; 297/474, 297/475, 477
See application file for complete search history.

(56) References Cited

U.S. PATENT DOCUMENTS

| 2,931,851 | A | * | 4/1960 | Sims ........................... 174/72 A |
| 3,371,736 | A | * | 3/1968 | Lewis et al. ................... 180/270 |
| 3,381,268 | A | * | 4/1968 | Boblitz ......................... 180/270 |
| 3,767,134 | A | * | 10/1973 | Morales ................. 200/61.58 B |
| 4,781,267 | A | * | 11/1988 | Waineo et al. ............... 180/268 |
| 4,787,569 | A | * | 11/1988 | Kanada et al. ............... 242/371 |
| 5,244,231 | A | * | 9/1993 | Bauer et al. .................. 280/807 |
| 5,495,995 | A | * | 3/1996 | Dominique et al. ....... 242/390.1 |
| 5,623,169 | A | * | 4/1997 | Sugimoto et al. ............ 307/10.1 |
| 5,765,774 | A | * | 6/1998 | Maekawa et al. .......... 242/390.9 |
| 6,550,810 | B1 | * | 4/2003 | Bauer et al. .................. 280/803 |
| 6,575,394 | B1 | * | 6/2003 | Fujita et al. ............... 242/390.8 |

(Continued)

FOREIGN PATENT DOCUMENTS

JP H08-040204 2/1996

(Continued)

OTHER PUBLICATIONS

Machine Translation of JP 2001-130376.*

*Primary Examiner* — Paul N Dickson
*Assistant Examiner* — Joseph Rocca
(74) *Attorney, Agent, or Firm* — Manabu Kanesaka

(57) ABSTRACT

A seat belt retractor (6) according to the present invention, when mounted on a vehicle body, has an ECU (16) laid out in such a manner that an ECU connector (16c) faces a vehicle side connector (18) mounted to a predetermined position of the vehicle body. Such a vehicle side connector (18) is connected to a power supply (17). Such a layout of the ECU (16) allows the ECU connector (16c) to be directly electrically connected to the vehicle side connector (18).

5 Claims, 4 Drawing Sheets

U.S. PATENT DOCUMENTS 6,598,823 B1 * 7/2003 Fujii et al. .................. 242/390.8
2006/0267330 A1 * 11/2006 Inuzuka et al. ............... 280/806

FOREIGN PATENT DOCUMENTS

| | | |
|---|---|---|
| JP | H09-272401 | 10/1997 |
| JP | 2000-135969 | 5/2000 |
| JP | 2001-130376 | 5/2001 |
| JP | 2001-130377 | 5/2001 |
| JP | 2001-187561 | 7/2001 |
| JP | 2001-199309 | 7/2001 |
| JP | 2007-145079 | 6/2007 |
| WO | WO 2008/049562 | 5/2008 |

* cited by examiner

US 7,988,197 B2

SEAT BELT RETRACTOR AND SEAT BELT APPARATUS PROVIDED THERWITH

RELATED APPLICATIONS

The present application is National Phase of International Application No. PCT/JP2008/059595 filed May 19, 2008, and claims priority from, Japanese Application No. 2007-216780 filed Aug. 23, 2007, the disclosure of which is hereby incorporated by reference herein in its entirety.

BACKGROUND ART

The present invention relates to the technical field of seat belt retractors and seat belt apparatuses provided with such seat belt retractors, which perform at least one of taking up and delivering of a seat belt by causing an electric motor to rotate a spool and, more particularly, to the technical field of a seat belt retractor and a seat belt apparatus that employs such a seat belt retractor in which the electric motor is controlled by an electronic control unit (ECU). References to right and left hand sides in the description correspond to those in the attached figures.

Seat belt apparatuses that have been provided in vehicles such as automobiles for years prevent an occupant from being ejected from a seat by restraining the occupant using a seat belt in the event of an emergency such as a vehicle collision. Such seat belt apparatuses are provided with a seat belt retractor for taking up the seat belt. In such a seat belt retractor, the seat belt is wound around a spool when not being worn by the occupant, and is delivered and worn by the occupant when an attempt to wear the seat belt is made by the occupant. In the event of an emergency, the locking mechanism of the seat belt retractor is activated to prevent the spool from rotating in the direction in which the seat belt is delivered, thereby preventing the seat belt from being delivered. This allows the seat belt to restrain the occupant in the event of an emergency.

As a conventional seat belt apparatus, a seat belt apparatus provided with a seat belt retractor that performs taking up of a seat belt by rotating and controlling a spool with an electric motor has been publicly made known in Japanese Unexamined Patent Application Publication No. 2001-130377.

FIG. 3 is a diagram exemplifying a conventional seat belt apparatus described in Japanese Unexamined Patent Application Publication No. 2001-130377. FIG. 4 is a diagram exemplifying a seat belt retractor used in such a seat belt apparatus.

As shown in FIGS. 3 and 4, the seat belt apparatus 1, as is the case with a conventional known three-point seat belt, includes a seat belt 3 that is connected at an end thereof, namely, a belt anchor 3a thereof to a body floor or a vehicle seat, a seat belt retractor 6 secured to the vehicle body for performing taking up of the seat belt 3 by causing an electric motor 4 to rotate a spool 5, a guide anchor 7 for guiding the seat belt 3 drawn out of the seat belt retractor 6 to an occupant's shoulder, a tongue 8 slidably supported by the seat belt 3 guided through the guide anchor 7, and a buckle 9, secured to the vehicle floor or the vehicle seat 2, which the tongue 8 is detachably inserted into and engaged with.

As is the case with a conventional known seat belt retractor, the seat belt retractor 6 according to an embodiment includes an inverted C shaped frame 10 having a back plate 10a and right and left side walls 10b, 10c projecting from both ends of the back plate 10a, respectively, the seat belt 3, the spool 5 rotatably supported by the frame 10 for taking up the seat belt 3, a spring device 11 supported by the frame 10 for normally urging the spool 5 in the direction in which the seat belt is taken up, a motor 4, as driving means, supported by the frame 10 for rotating the spool 5, a power transmission mechanism 12 supported by the frame 10 for changing the speed of the motor 4 and transmitting it to the spool 5, and a circuit board 14 supported by a cover 13 provided on the left side wall 10b of the frame 10 and having a printed circuit 14a for driving and controlling the motor 4. Accordingly, taking up of the seat belt 3 is performed by an urging force only of the spring device 11 or the urging force of the spring device 11 and the driving force of the motor 4.

Although not illustrated in FIG. 4, the frame is provided at the right side wall 10c thereof with a vehicle sensor (deceleration sensing mechanism) that is activated when a vehicle is subjected to a deceleration greater than a predetermined level in the event of a vehicle collision or the like, a conventional known webbing sensor that is activated when the seat belt 3 is delivered more quickly and rapidly than normal seat belt delivery (more natural delivery of a seat belt when an occupant is normally wearing the seat belt), and a conventional known locking mechanism that is activated in conjunction with activation of the vehicle sensor and the webbing sensor for locking the rotation of the spool 5 in the direction in which the seat belt is delivered.

Although the circuit board 14 is not directly disclosed in Japanese Unexamined Patent Application Publication No. 2001-130377, a vehicle side connector that is connected to a power supply is provided at a predetermined position on the vehicle body. The circuit board 14 is electrically connected to such a vehicle side connector, and an intermediate harness is typically used for that connection. The use of the intermediate harness has caused the layout of the circuit board 14 to be determined for years, irrespective of the location of the vehicle side connector.

However, the conventional seat belt retractor requires the intermediate harness to electrically connect the circuit board 14 to the vehicle side connector, resulting in an increased number of components and resultant increased costs, which makes more troublesome assembling of the seat belt retractor 6 provided integrally with the circuit board 14.

DISCLOSURE OF INVENTION

Accordingly, an object of the present invention is to provide a seat belt retractor and a seat belt apparatus that uses such a retractor, which allow easy assembling by reducing the number of components as much as possible.

In order to attain the foregoing object, a seat belt retractor according to the present invention includes at least a spool rotatably supported by a frame for taking up a seat belt, a motor for rotating the spool, and an electronic control unit for driving and controlling the motor, wherein the electronic control unit is provided in an integrated manner and, when the seat belt retractor is mounted on the vehicle body, the electronic control unit is disposed in such a manner that an electronic control unit connector of the electronic control unit faces a vehicle side connector that is mounted on the vehicle body and is connected to a power supply.

The seat belt retractor according to the present invention is characterized in that the electronic control unit is formed in the shape of a flat plate and that the electronic control unit is provided horizontally on the frame.

In addition, the seat belt retractor according to the present invention is characterized in that the electronic control unit is formed in the shape of a flat plate and that the electronic control unit is provided on the frame in the vertical direction.

Furthermore, the seat belt apparatus according to the present invention includes at least the seat belt retractor that performs at least one of taking up and delivering of the seat belt by causing the electric motor to rotate the spool, a tongue slidably supported by the seat belt drawn out of the seat belt retractor, and a buckle with which such a tongue is detachably engaged in which the seat belt restrains the occupant by causing the tongue to be engaged with the buckle, wherein the seat belt retractor is a seat belt retractor according to the present invention and the electronic control unit connector is directly connected to the vehicle side connector.

With this arrangement, the seat belt retractor according to the present invention allows the electronic control unit to be laid out in such a manner that the electronic control unit connector faces the vehicle side connector when the seat belt retractor provided integrally with the electronic control unit is mounted to the vehicle body, thereby allowing the electronic control unit connector to be directly connected to the vehicle side connector. This eliminates the need for intermediate harnesses that have been used for years to connect the electronic control unit connector and the vehicle side connector. Accordingly, this results in a reduction in the number of components which leads to cost reduction as well as allows the seat belt retractor and the electronic control unit to be easily assembled into the vehicle body.

With this arrangement, the seat belt apparatus according to the present invention can eliminate the need for the intermediate harness used to connect the electronic control unit connector and the vehicle side connector, thereby also eliminating the need for routing the intermediate harness in the vehicle body. This reduces a space for the intermediate harness as well as achieves easy connection between the electronic control unit connector and the vehicle side connector.

BEST MODES FOR CARRYING OUT THE INVENTION

The best modes for carrying out the present invention are described below using the attached drawings.

Figure 1:
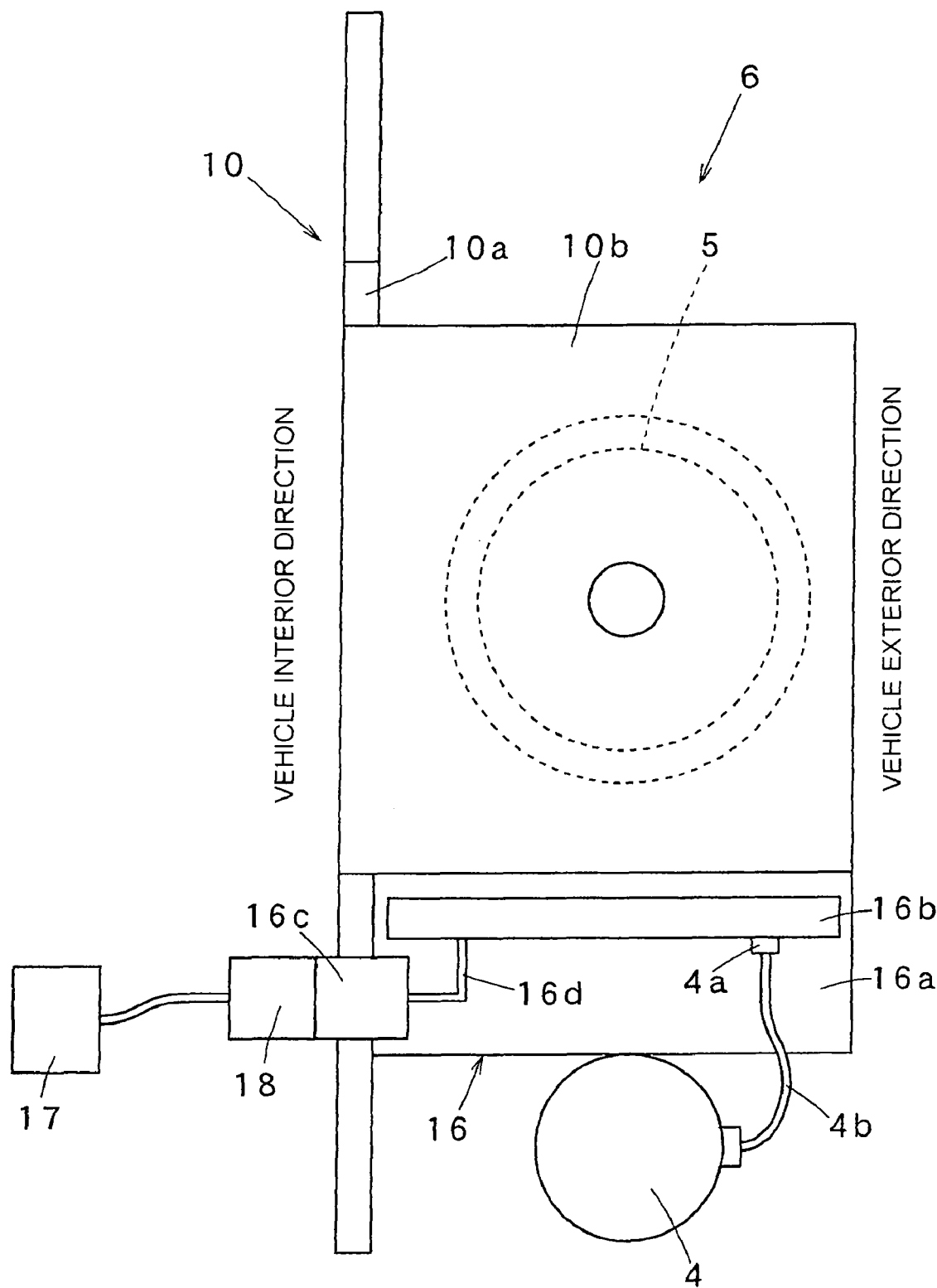
FIG. 1 is a diagram exemplifying a seat belt retractor according to an embodiment of the present invention.

FIG. 1 is a diagram exemplifying a seat belt retractor according to an embodiment of the present invention.

As shown in FIG. 1, a seat belt retractor 6 has a flat plate-shaped electronic control unit (ECU) 16 for driving and controlling a motor 4. The ECU 16 includes a case 16a, an ECU substrate 16b housed and secured in the case 16a for driving and controlling the motor 4, and an ECU connector 16c secured and supported by the case 16a. In this case, the ECU substrate 16b and the ECU connector 16c are electrically connected to each other with a wire 16d. In other words, the case 16a, the ECU substrate 16b, and the ECU connector 16c are assembled in an integrated manner. The case 16a is horizontally mounted and secured at lower edges of both the side walls 10b, 10c of the frame 10 between both the side walls 10b, 10c. The ECU connector 16c may be secured to the back plate 10a of the frame 10.

The motor 4 is secured to and supported by the case 16a of the ECU 16. Although the figure shows that the lengthwise direction of the motor 4 is configured to be generally parallel to a back plate 10a of the frame 10, the lengthwise direction of the motor 4 is not necessarily parallel to the back plate 10a. A harness 4b having a motor connector 4a connected to an end thereof extends from the motor 4, and the motor connector 4a is electrically connected to the ECU 16. The motor connector 4a may be connected to the ECU connector 16c together with a vehicle side connector 18.

In the seat belt retractor 6 according to this embodiment, when the seat belt retractor 6 is mounted in the vehicle body, the ECU 16 is laid out in such a manner that the ECU connector 16c faces the vehicle side connector 18 mounted at a predetermined location on the vehicle body. The vehicle side connector 18 is connected to a power supply 17. This layout of the ECU 16 allows the ECU connector 16c to be directly electrically connected to the vehicle side connector 18.

With this arrangement, the seat belt retractor 6 according to this embodiment has the ECU connector 16c provided in the ECU 16 in an integrated manner and, when the seat belt retractor 6 provided integrally with the ECU 16 is mounted on the vehicle body, has the ECU 16 laid out in such a manner that the ECU connector 16c faces the vehicle side connector 18, thereby allowing the ECU connector 16c to be directly connected to the vehicle side connector 18. This can eliminate the need for intermediate harnesses that have been used for years to connect the ECU connector 16c and the vehicle side connector 18. Accordingly, this results in a reduction in the number of components which leads to cost reduction as well as allows the seat belt retractor 6 and the ECU 16 to be easily assembled into the vehicle body.

Also, the ECU connector 16c is provided in the case 16a in an integrated manner, thereby eliminating the need for conventional intermediate harnesses used to connect the ECU substrate 16b and the ECU connector 16c. This results in a further reduction in the number of components as well as easy assembly.

Furthermore, the ECU 16 is provided at the lower edges of both the side walls 10b, 10c of the frame 10, and the motor 4 is secured to and supported by the case 16a of the ECU 16. In addition, the ECU connector 16c is provided in the case 16a in an integrated manner, thereby allowing the ECU 16 and the motor 4 to be disposed in a lower space that is a dead space located in the seat belt retractor 6 at the lower part of both the side walls 10b, 10c, which results in the effective use of such a lower space. Accordingly, even if the ECU 16 and the motor 4 are provided in the seat belt retractor 6, the seat belt retractor 6 can be formed in a compact manner either laterally or longitudinally. For this, the seat belt retractor 6 can be easily assembled into a relatively narrow space such as the inside of a center pillar in which the conventional seat belt retractor 6 has been disposed.

In addition, the ECU 16 is disposed among both the side walls 10b, 10c and the motor 4, thereby allowing both the side walls 10b, 10c and the motor 4 to protect ECU 16 when the seat belt retractor 6 is subjected to an impact load.

Although not illustrated in FIG. 1, as is the case with a conventional known seat belt retractor, the seat belt retractor 6 according to this embodiment also has a spring mechanism 11, a power transmission mechanism 12, a locking mechanism, a vehicle sensor, and a webbing sensor provided therein. Other advantages of the seat belt retractor 6 according to this embodiment are the same as those of the conventional known seat belt retractors. Furthermore, rotational control of the spool 5 by the motor 4 is the same as that of the conventional seat belt retractor provided with a motor.

Figure 2:
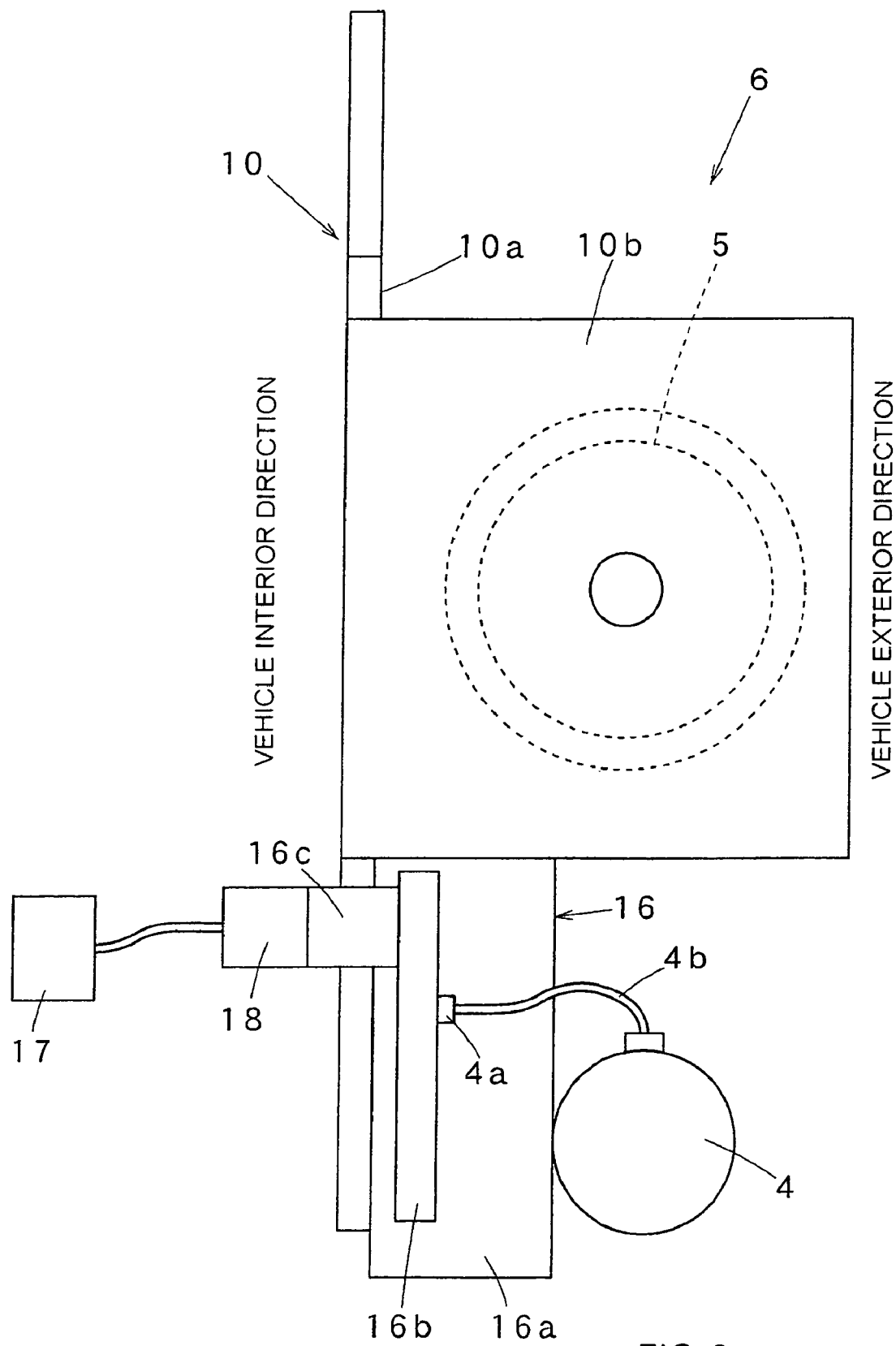
FIG. 2 is a diagram exemplifying a seat belt retractor according to another embodiment of the present invention.

FIG. 2 is a diagram exemplifying a seat belt retractor according to another embodiment of the present invention, which is similar to FIG. 1.

In the foregoing embodiment shown in FIG. 1, the flat plate-shaped ECU 16 is horizontally mounted and secured at the lower edges of both the side walls 10b, 10c of the frame 10 between both the side walls 10b, 10c. However, as shown in FIG. 2, in the seat belt retractor 6 according to this embodiment, the flat-plate shaped ECU 16 is oriented toward the up-and-down direction (vertical direction) and secured to and supported by the back plate 10a of the frame 10 in a lower space which is located at the lower portion of both the side walls 10b, 10c of the frame 10. Then, the motor 4 is secured to and supported by the case 16a of the ECU 16. In this embodiment, the ECU connector 16c is electrically directly connected to the ECU substrate 16b, but the wire 16d shown in the foregoing embodiment of FIG. 1 is not provided.

Other configurations and other advantages of this embodiment are the same as those of the embodiment shown in FIG. 1.

Although the ECU 16 is provided in the lower space of both the side walls 10b, 10c of the frame 10 in the foregoing embodiment, the ECU 16 may be provided in an upper space of both the side walls 10b, 10c of the frame 10 or in the opposite side of the spool 5 in the back plate 10a of the frame 10.

Although the motor 4 is supported by the case 16a of the ECU 16 in an integrated manner in the foregoing embodiment, the motor 4 needs not necessarily be supported by the case 16a of the ECU 16, but may be supported directly by the frame 10.

In addition, as described in the foregoing Japanese Unexamined Patent Application Publication No. 2001-130377, the seat belt retractor according to the present invention may be configured to perform only taking up of the seat belt by driving force of the motor, or may be configured to perform only delivering of the seat belt by driving force of the motor. Furthermore, it may be configured to perform both taking up and delivering of the seat belt by driving force of the motor. In other words, the seat belt retractor according to the present invention performs at least one of taking up and delivering of the seat belt.

Figure 3:
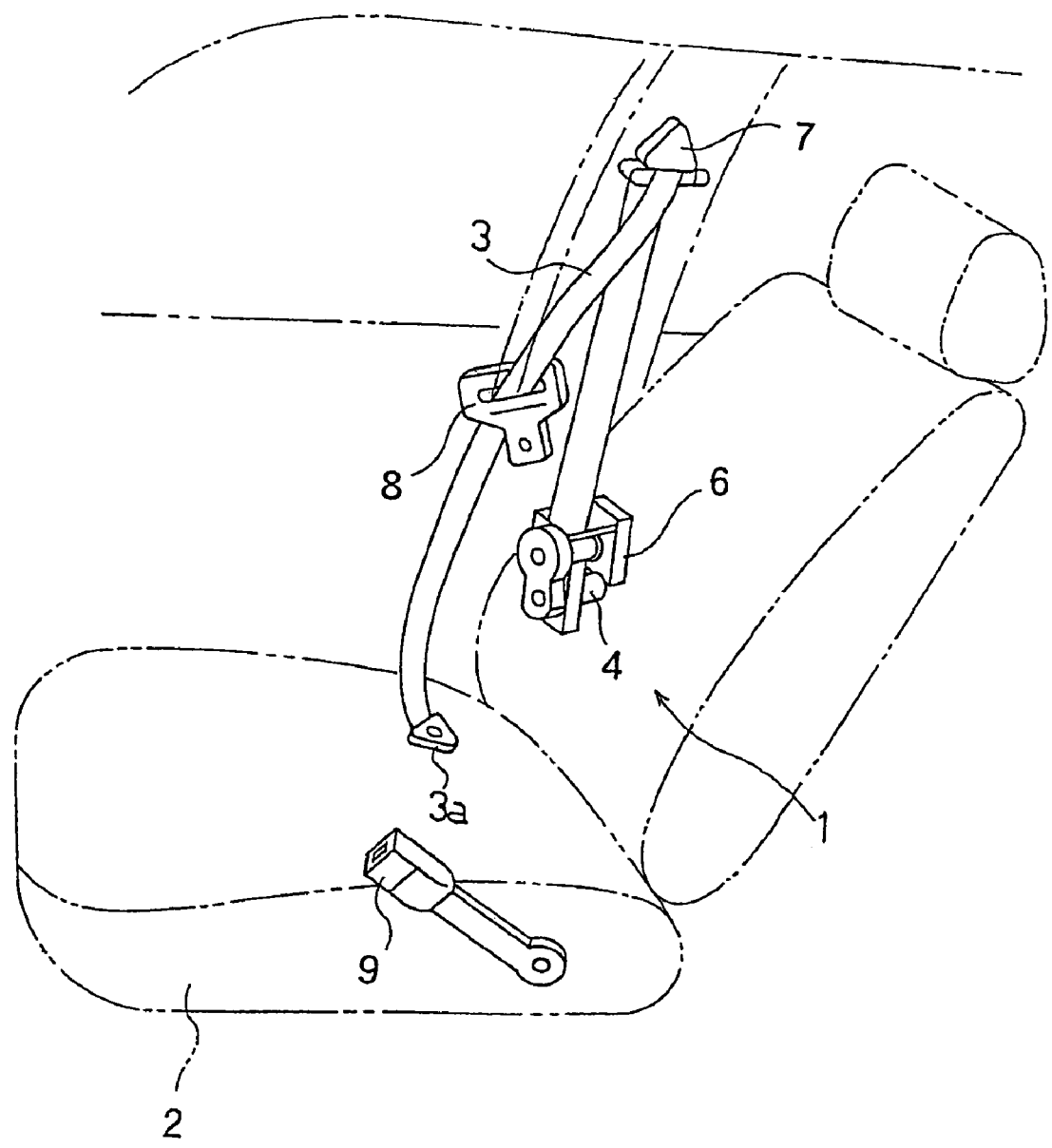
FIG. 3 is a diagram exemplifying a conventional seat belt apparatus.
Figure 4:
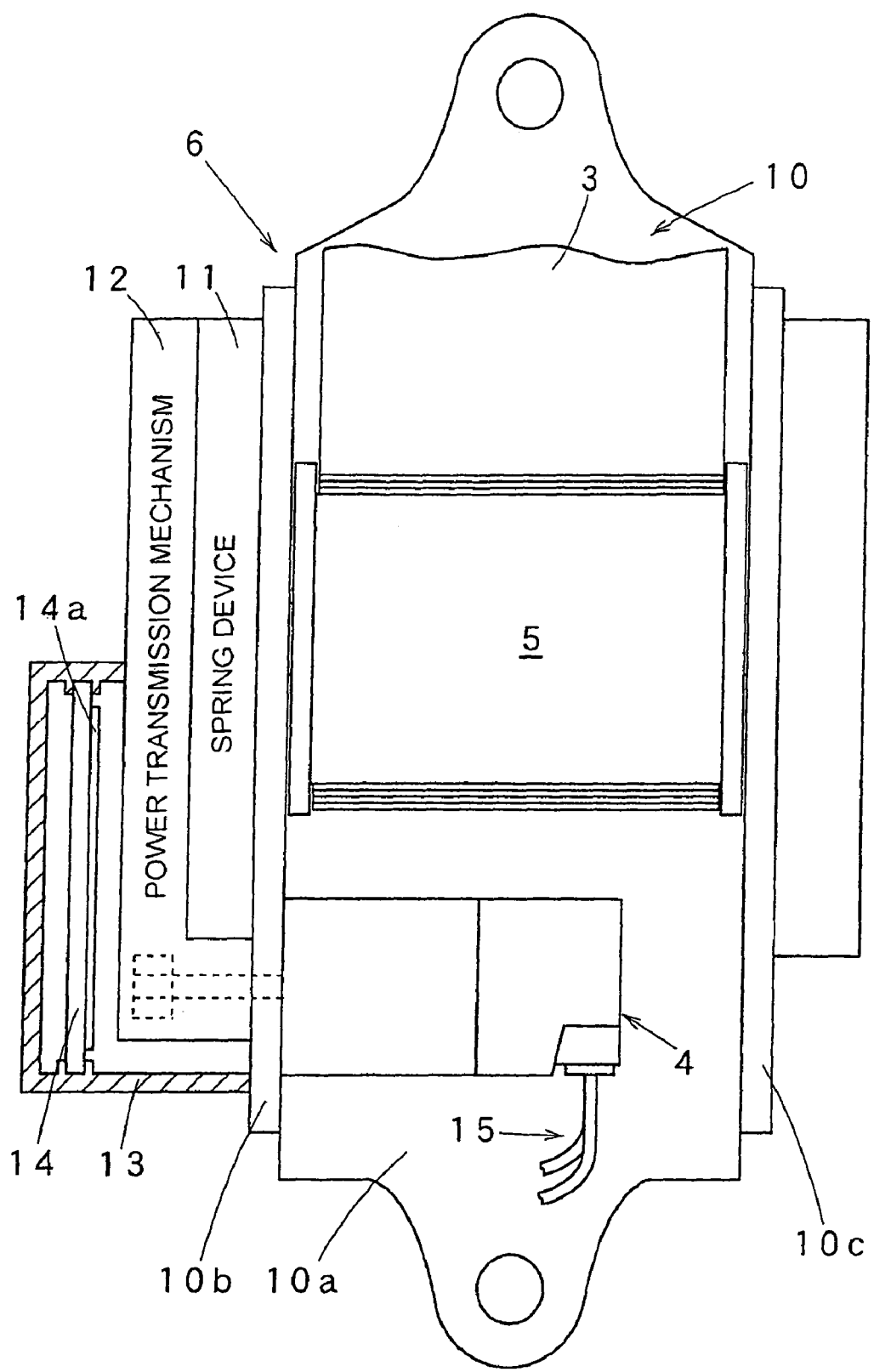
FIG. 4 is a diagram exemplifying a seat belt retractor used in a seat belt apparatus shown in FIG. 3.

Both the seat belt retractors 6 according to the foregoing embodiments shown in FIGS. 1 and 2 can be used for the seat belt retractor 6 of, for example, the conventional three-point seat belt apparatus 1 shown in FIG. 3.

As described above, the seat belt apparatus provided with the seat belt retractor 6 according to the present invention can eliminate the need for an intermediate harness for connecting the ECU connector 16c and the vehicle side connector 18, thereby eliminating the need for routing of the intermediate harness in a vehicle body. This allows reduction of the space for placing the intermediate harness as well as easy connection between the ECU connector 16c and the vehicle side connector 18.

In addition, as described above, the seat belt retractor 6 can be formed in a so compact manner as to be assembled into a narrow space inside the center pillar or the like, thereby preventing the seat belt retractor 6 from needlessly occupying the interior space of a vehicle passenger compartment. This improves restraining of occupants through belt tension control of the seat belt 3 provided by the motor 4, while ensuring occupant comfort in the passenger compartment.

INDUSTRIAL APPLICABILITY

The seat belt retractor and the seat belt apparatus according to the present invention can be applied to seat belt retractors and seat belt apparatuses provided with such seat belt retractors, which perform at least one of taking up and delivering of a seat belt by causing an electric motor to rotating and controlling a spool.

The invention claimed is:

1. A seat belt retractor comprising:
    a frame having a back plate and essentially parallel side walls disposed at both sides of the back plate;
    a spool disposed between and rotatably supported by the side walls of the frame, the spool being configured for taking up a seat belt;
    a motor for rotating the spool;
    an electronic control unit for driving and controlling the motor, the electronic control unit being electrically connected to the motor;
    a case mounted on the back plate below the side walls, the electronic control unit being disposed in the case, the motor being disposed externally of the case; and
    an electronic control unit connector connected to the electronic control unit, and directly secured to the back plate;
    wherein when the frame is mounted on a vehicle body, the electronic control unit connector of the electronic control unit is adapted to face and directly connected to a vehicle side connector that is mounted on the vehicle body and that is connected to a power supply.

2. The seat belt retractor according to claim 1, wherein the electronic control unit is formed in the shape of a flat plate and is mounted in the case laterally so as to extend perpendicularly to the back plate of the frame.

3. The seat belt retractor according to claim 1, wherein the electronic control unit is formed in the shape of a flat plate and the electronic control unit is mounted in the case so as to extend parallel to the back plate of the frame.

4. A seat belt apparatus comprising at least:
    a seat belt retractor that performs at least one of taking up and delivery of a seat belt by causing the motor to rotate the spool;
    a tongue slidably supported by the seat belt drawn out of the seat belt retractor; and
    a buckle with which the tongue is detachably engaged in which the seat belt restrains an occupant by causing the tongue to be engaged with the buckle,
    wherein the seat belt retractor is a seat belt retractor according to claim 1; and
    wherein the electronic control unit connector is directly connected to the vehicle side connector.

5. The seat belt retractor according to claim 1, wherein the back plate is flat and has a rear surface adapted to face an interior of the vehicle body with the side walls extending away from a front face in an outboard direction of the vehicle body.

* * * * *